Oct. 17, 1967

D. LEHRMAN 3,347,403

CONTAINER

Filed Jan. 11, 1966

INVENTOR.
DAVID LEHRMAN
BY
ATTORNEYS.

United States Patent Office 3,347,403
Patented Oct. 17, 1967

3,347,403
CONTAINER
David Lehrman, Cheltenham, Pa., assignor to The Ironees Company, Philadelphia, Pa., a corporation of Pennsylvania
Filed Jan. 11, 1966, Ser. No. 520,016
6 Claims. (Cl. 220—17)

ABSTRACT OF THE DISCLOSURE

A pair of containers, one within the other, is described, showing an adapter having a pair of radially extending flanges where one flange is used to support the adapter and the second flange is used to suspend the inner container from the so-supported adapter within the outer container.

---

This invention relates to a container, and more particularly, to a container structurally interrelated in a manner so that it is provided with two separate compartments isolated from one another.

The container of the present invention is particularly adapted for containing two separate liquids or fluids which must be maintained isolated from one another. The container may be made from non-corrosive, lightweight polymeric material such as polyethylene. The container of the present invention includes an inner vessel and an outer vessel. The inner vessel is supported within the outer vessel in a manner so as to prevent the liquids within the respective vessels to be mixed while preventing relative movement between the vessels.

The container of the present invention enables various chemicals to be shipped in a single container and thereby greatly facilitate merchandising of such products which otherwise would have to be shipped in two separate containers. At the same time, this is accomplished in a manner which is simple, reliable and inexpensive.

It is an object of the present invention to provide a novel container.

It is another object of the present invention to provide a container having an inner vessel and an outer vessel so that two separate liquids may be sold within the same container without permitting the liquids to mix.

It is another object of the present invention to provide a container structurally interrelated in a novel manner so as to provide one vessel within another with the inner vessel being substantially smaller than the outer vessel.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 a container designated generally as 10.

Figure 1:
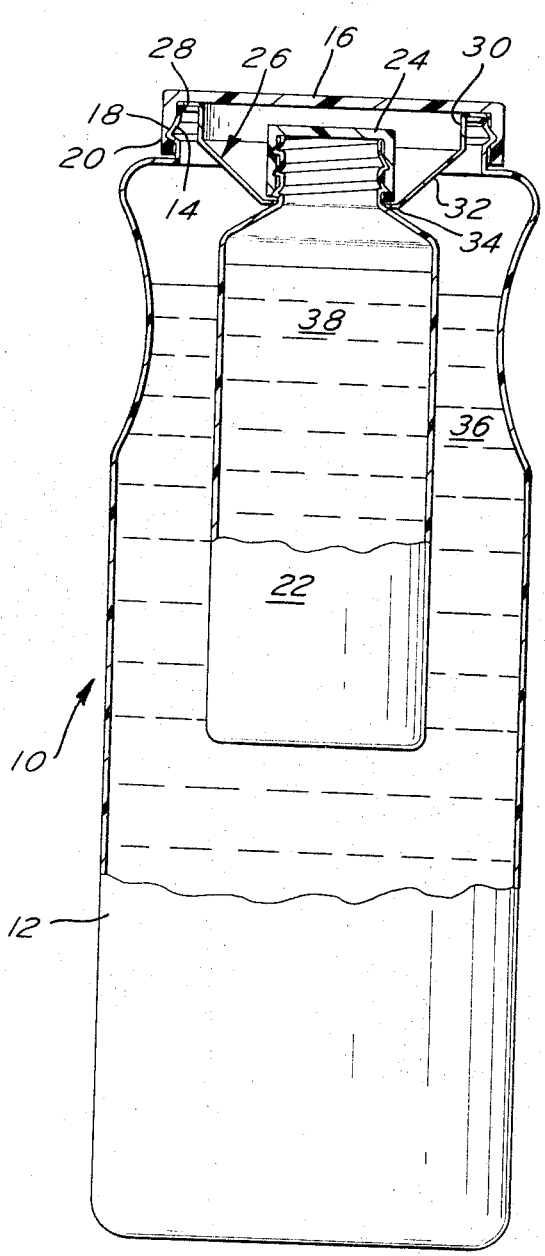
FIGURE 1 is an elevation view of the container of the present invention partly broken away for purposes of illustration.
Figure 2:
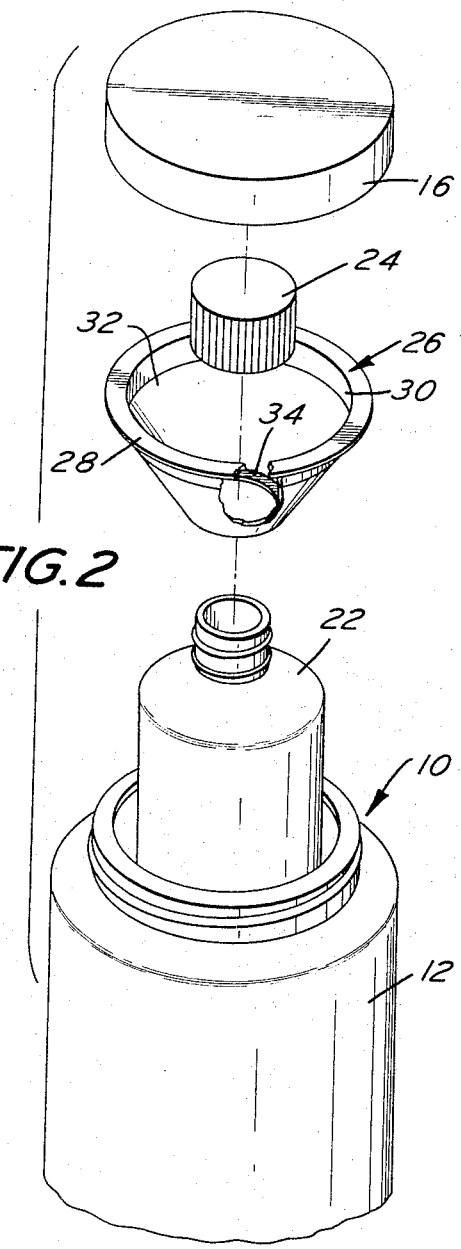
FIGURE 2 is an exploded view showing the components of the container of the present invention.

The container 10 includes an outer vessel designated generally as 12 having threads 14 on the outer periphery of a neck portion at the upper end of the vessel. A removable cap 16 is provided for the vessel 12. Cap 12 is provided with an axially directed lip 20 having threads 18 on its inner peripheral surface. The threads 14 and 18 removably couple the cap 16 to the open end of the vessel 12.

An inner vessel 22 having a removable cap 24 is removably suspended within the vessel 12 by means of an adapter designated generally as 26. Adapter 26 is annular in configuration and includes a radially outwardly directed flange 28 overlying the end face of the neck portion of the vessel 12. Hereinafter, said end face may be referred to as a generally flat surface lying in a plane substantially perpendicular to the longitudinal axis of the vessel 12.

From the inner periphery of the flange 28, the adapter 26 includes a generally axially directed portion 30 which blends into a converging portion 32 which forms an angle of approximately 45° with the horizontal. From the inner periphery of portion 32, there is provided a radially inwardly directed flange 34. Flange 34 is parallel to flange 28. The axial dimension of cap 24 is slightly less than the distance between parallel planes containing the flanges 28 and 34.

The inner diameter of flange 34 is smaller than the outer diameter of the cap 24. The cap 24 is threadedly coupled to the neck portion of its vessel 22 and thereby facilitates suspending the vessel 22 within the vessel 12 by means of the adapter 26. In a preferred embodiment, the inner diameter of the flange 34 is substantially equal to the root diameter of the thread on the neck of vessel 22 and the outer diameter of the flange 34 corresponds generally to the outer diameter of the cap 24.

When in use, a liquid 36 is disposed within the outer vessel 12 and a liquid 38 is disposed within the vessel 22. The weight of the vessel 22 is supported by the adapter 26 and assisted to a certain extent by the buoyancy provided by liquid 36. The caps 16 and 24 may be utilized to accomplish a mixing of predetermined amounts of liquid 36 with liquid 38.

When the cap 16 is in place as illustrated in FIGURE 1, it overlies the flange 28 and retains the same immobile. As a result thereof, the vessels 12 and 22 have no relative motion. When it is desired to have access to either liquid 36 or 38, cap 16 is removed by unthreading the same. Thereafter, the operator grasps the vessel 22 by the cap 24 and raises the same in an axial direction. During such raising of the vessel 22, the adapter 26 acts as a shield so as to prevent one's fingers from coming in contact with liquid 36. Thereafter, the cap 24 may be unthreaded so as to provide access to the liquid 38. The adapter 26 may be retained on the vessel 22 if the entire quantity of liquid 38 has not been used. Thereafter, the vessel 22 may be repositioned to that illustrated in FIGURE 1 for purposes of storage.

The adapter 26 is preferably vacuum formed from a lightweight polymeric material such as polyethylene. If desired, adapter 26 may be injection molded from a similar material.

The liquids 36 and 38 may be any liquids which should not be mixed until it is desired to utilize a small portion of the same. For example, the liquids 36 and 38 may be the ingredients of an adhesive such as an epoxy resin. I have found that the container 10 is particularly adapted for use wherein the liquids 36 and 38 are the ingredients of a solution to be applied to fabric to provide a permanent press finish on the fabric.

Vessel 12 is approximately six or seven times the size and capacity of vessel 22. If desired, adapter 26 could have a portion extending axially along the outer periphery of vessel 22 and a portion engaging the bottom of vessel 22 for supporting the same. Instead of engaging the adapter 26, the inner surface of the cap 16 could engage the cap 24 to render the same stationary.

The present invention may be embodied in other specific forms without departing from the spirit or essential attributes thereof and, accordingly, reference should be made to the appended claims, rather than to the foregoing specification as indicating the scope of the invention.

I claim:

1. A container comprising an inner vessel, an outer vessel, and means for mounting said inner vessel completely within said outer vessel, said inner and outer vessels having caps and cap-receiving neck portions, said cap-receiving neck portion of said inner vessel being substantially smaller than the cap-receiving neck portion of said outer vessel, and said inner vessel being smaller than and completely contained inside of said outer vessel; the means for mounting said inner vessel within said outer vessel comprising an adapter having an upright portion within said outer vessel, a radially outwardly extending flange at the upper end of said upright portion, said adapter being removably attached to said outer vessel by engagement between said flange and the cap-receiving neck portion of said outer vessel, such engagement supporting the adapter within said outer vessel; said upright portion of said adapter containing at its lower end a radially inwardly extending flange which is smaller than the outer periphery of the cap of the inner vessel, said flange being removably attached to said inner vessel by engagement with the bottom horizontal surface of said cap whereby said inner container is supported completely within said outer container.

2. A container in accordance with claim 1 wherein said container is further characterized by said outer vessel cap having a portion for contact with the outwardly extending flange of said adapter and a portion for contact with the cap of said inner vessel to render the adapter and the inner vessel immobile with respect to the outer vessel.

3. A container in accordance with claim 1 wherein said flange overlies an end face of the outer vessel, and said cap portion being the inner surface of said outer vessel cap.

4. A container in accordance with claim 1 wherein said vessels are made from inert polymeric plastic materials, and said adapter being made from a polymeric material.

5. A container in accordance with claim 1 wherein said upright portion of said adapter includes a converging portion disposed between parallel planes containing said flanges.

6. A container in accordance with claim 1 wherein the outer vessel is approximately six times the size of the inner vessel, with each vessel and the adapter being made from a polymeric plastic material.

References Cited
UNITED STATES PATENTS 2,321,998   6/1943   Crouch et al. _____ 215—6

THERON E. CONDON, *Primary Examiner.*

JAMES B. MARBERT, *Examiner.*